US011879268B2

(12) United States Patent
Martin et al.

(10) Patent No.: US 11,879,268 B2
(45) Date of Patent: Jan. 23, 2024

(54) DOOR LOCK BEZEL WITH TOUCH AND WIRELESS CAPABILITIES

(71) Applicant: Level Home, Inc., Redwood City, CA (US)

(72) Inventors: John H. Martin, Atherton, CA (US); Kenneth D. Goto, Emerald Hills, CA (US)

(73) Assignee: Level Home, Inc., Redwood City, CA (US)

(*) Notice: Subject to any disclaimer, the term of this patent is extended or adjusted under 35 U.S.C. 154(b) by 1222 days.

(21) Appl. No.: 16/217,859

(22) Filed: Dec. 12, 2018

(65) Prior Publication Data

US 2019/0178003 A1 Jun. 13, 2019

Related U.S. Application Data

(60) Provisional application No. 62/597,890, filed on Dec. 12, 2017.

(51) Int. Cl.

| | |
|---|---|
| ***E05B 47/00*** | (2006.01) |
| ***E05B 15/02*** | (2006.01) |
| ***G07C 9/00*** | (2020.01) |
| *E05B 35/00* | (2006.01) |

(52) U.S. Cl.

CPC .......... *E05B 47/0001* (2013.01); *E05B 15/02* (2013.01); *E05B 47/00* (2013.01); *G07C 9/00174* (2013.01); *E05B 2035/009* (2013.01); *E05B 2047/0067* (2013.01); *E05B 2047/0084* (2013.01); *E05B 2047/0095* (2013.01); *G07C 9/00563* (2013.01); *G07C 9/00904* (2013.01)

(58) Field of Classification Search

CPC ...... E05B 47/00; E05B 47/0001; E05B 15/02; E05B 2035/009; E05B 2047/0067; E05B 2047/0084; E05B 2047/0095; G07C 9/00174; G07C 9/00563; G07C 9/00904; Y10T 70/7107; Y10T 70/7113; Y10T 70/7119; Y10T 70/7124; Y10T 70/713; Y10T 70/7136

USPC ................................................ 70/279.1–283

See application file for complete search history.

(56) References Cited

U.S. PATENT DOCUMENTS

| | | | | |
|---|---|---|---|---|
| 6,298,147 B1 * | 10/2001 | Ilan | G07C 9/37 | 382/119 |
| 7,239,227 B1 * | 7/2007 | Gupta | G06K 9/00006 | 340/5.82 |
| 7,908,896 B1 | 3/2011 | Olson et al. | | |
| 8,006,525 B2 * | 8/2011 | Huang | E05B 47/068 | 70/107 |

(Continued)

FOREIGN PATENT DOCUMENTS

| | | |
|---|---|---|
| CN | 101806174 A | 8/2010 |
| CN | 103526991 A | 1/2014 |
| WO | 2017180688 A1 | 10/2017 |

OTHER PUBLICATIONS

Authentec, Inc., "TCS1/TCS2-TCD58E TouchChip Chipset Datasheet", 2011, pp. i-46.

*Primary Examiner* — Suzanne L Barrett

(74) *Attorney, Agent, or Firm* — Perkins Coie LLP; Colin Fowler; Brian Coleman

(57) ABSTRACT

An electromechanical lock can have a bezel along an exterior surface. A touch of a human finger upon the bezel can be determined and used to adjust a deadbolt between a lock state and an unlock state.

18 Claims, 11 Drawing Sheets

(56) References Cited

U.S. PATENT DOCUMENTS

| | | | | |
|---|---|---|---|---|
| 8,079,240 | B2 * | 12/2011 | Brown | G07C 9/00896 70/277 |
| 8,284,023 | B2 * | 10/2012 | Coutermarsh | E05B 47/026 340/5.73 |
| 8,589,032 | B2 * | 11/2013 | Witte | E05B 85/12 701/45 |
| 8,593,249 | B2 * | 11/2013 | Bliding | G07C 9/00174 340/5.2 |
| 8,683,833 | B2 * | 4/2014 | Marschalek | E05B 9/08 70/473 |
| 8,689,591 | B2 * | 4/2014 | Elsner | E05B 47/0012 70/63 |
| 8,876,050 | B2 * | 11/2014 | Wentland | B64D 11/04 244/129.4 |
| 9,551,168 | B2 * | 1/2017 | Dias | E05B 47/026 |
| 9,695,616 | B2 * | 7/2017 | Johnson | E05B 47/0012 |
| 9,836,900 | B2 * | 12/2017 | Jun | G07C 9/29 |
| 10,125,519 | B1 * | 11/2018 | Gengler | E05B 9/04 |
| 10,612,272 | B2 * | 4/2020 | Wu | E05B 47/0012 |
| 10,614,645 | B1 * | 4/2020 | Tsai | E05B 47/00 |
| 10,672,209 | B2 * | 6/2020 | Lee | H04W 4/80 |
| 10,692,312 | B1 * | 6/2020 | Niranjayan | G07C 9/25 |
| 10,738,504 | B2 * | 8/2020 | Uyeda | E05B 47/06 |
| 10,968,660 | B2 * | 4/2021 | Maiga | E05B 17/2073 |
| 11,021,894 | B1 * | 6/2021 | Zastrow | E05B 47/0669 |
| 11,450,158 | B2 * | 9/2022 | Chong | E05B 47/026 |
| 2003/0141959 | A1 * | 7/2003 | Keogh | E05B 65/0075 340/5.53 |
| 2004/0045330 | A1 | 3/2004 | Moon et al. | |
| 2009/0242699 | A1 * | 10/2009 | Wentland | G07C 9/00182 244/118.5 |
| 2010/0031714 | A1 * | 2/2010 | Brown | G07C 9/00896 70/91 |
| 2012/0011902 | A1 * | 1/2012 | Meekma | E05B 47/0012 70/25 |
| 2013/0192316 | A1 * | 8/2013 | McKibben | E05B 47/02 70/278.1 |
| 2013/0192318 | A1 * | 8/2013 | Yanar | E05B 47/0012 70/279.1 |
| 2014/0157842 | A1 * | 6/2014 | Almomani | E05B 47/0001 70/277 |
| 2014/0292481 | A1 * | 10/2014 | Dumas | G07C 9/00571 340/5.61 |
| 2015/0022466 | A1 * | 1/2015 | Levesque | G06F 21/32 345/173 |
| 2015/0027178 | A1 * | 1/2015 | Scalisi | H04N 7/188 70/277 |
| 2015/0218850 | A1 | 8/2015 | Uyeda et al. | |
| 2015/0284986 | A1 * | 10/2015 | Wall | E05B 47/00 109/38 |
| 2015/0332532 | A1 * | 11/2015 | Lee | G07C 9/00563 340/5.72 |
| 2015/0371469 | A1 * | 12/2015 | Scalisi | G07C 9/00563 340/5.52 |
| 2017/0180539 | A1 * | 6/2017 | Payack, Jr. | G07C 9/00309 |
| 2017/0193724 | A1 * | 7/2017 | Johnson | G08B 13/19695 |
| 2017/0204636 | A1 * | 7/2017 | Sack | G07C 9/00309 |
| 2017/0230509 | A1 * | 8/2017 | Lablans | H04J 13/0074 |
| 2017/0263067 | A1 * | 9/2017 | Scalisi | G07C 9/00174 |
| 2018/0135337 | A1 * | 5/2018 | Johnson | G08B 3/10 |
| 2020/0242868 | A1 * | 7/2020 | Gengler | G07C 9/00174 |
| 2021/0005036 | A1 * | 1/2021 | Johnson | H04N 7/186 |

* cited by examiner

DOOR LOCK BEZEL WITH TOUCH AND WIRELESS CAPABILITIES

CLAIM FOR PRIORITY

This application claims benefit of U.S. Provisional Patent Application No. 62/597,890, entitled "Door Lock Bezel with Touch and Wireless Capabilities," by Martin et al., and filed on Dec. 12, 2017. The content of the above-identified application is incorporated herein by reference in their entirety.

TECHNICAL FIELD

This disclosure relates to an electromechanical lock, and in particular a bezel of an electromechanical lock providing touch and wireless capabilities to lock and unlock a door.

BACKGROUND

Door locks can include a deadbolt as a locking mechanism. For example, the door lock can include a lock cylinder with a key slot on one side of the cylinder. The other side of the cylinder can include a paddle, or a twist knob. The rotation of the cylinder using the key (inserted into the key slot and rotated) or the paddle (moved or rotated to another position) can result in the deadbolt of the lock to retract (e.g., to unlock the door) or extend (e.g., to lock the door). However, some homeowners find it cumbersome to be limited to locking or unlocking the door lock of a door using the key or the paddle.

SUMMARY

Some of the subject matter described herein includes an electromechanical smart lock to lock and unlock a door of a building, comprising: a housing having a bezel defining an exterior surface of the electromechanical smart lock; a touch sensor circuitry configured to determine presence of a finger upon the bezel, and determine characteristics of the finger upon the determination of the presence of the finger upon the bezel; a deadbolt configured to travel along a linear path between the electromechanical smart lock and a deadbolt slot of a door jamb; a motor configured to retract the deadbolt into the electromechanical lock to operate in an unlock state, and configured to extend the deadbolt into the deadbolt slot in a lock state; and a controller circuit configured to operate the motor to retract or extend the deadbolt based on the characteristics of the finger.

Some of the subject matter described herein also includes an electromechanical lock, comprising: a bezel defining an exterior surface of the electromechanical smart lock; a deadbolt configured to retract to be in an unlock state, and configured to extend to be in a lock state; and a controller circuit configured to determine characteristics of a finger disposed upon the bezel, and configured to adjust the deadbolt between the lock state and the unlock state based on the characteristics of the finger.

Some of the subject matter described herein also includes a method comprising: determining, by a processor, that a finger is placed upon an electromechanical lock; determining, by the processor, characteristics of the finger; and adjusting a position of a deadbolt based on the characteristics of the finger.

DETAILED DESCRIPTION

Figure 1:
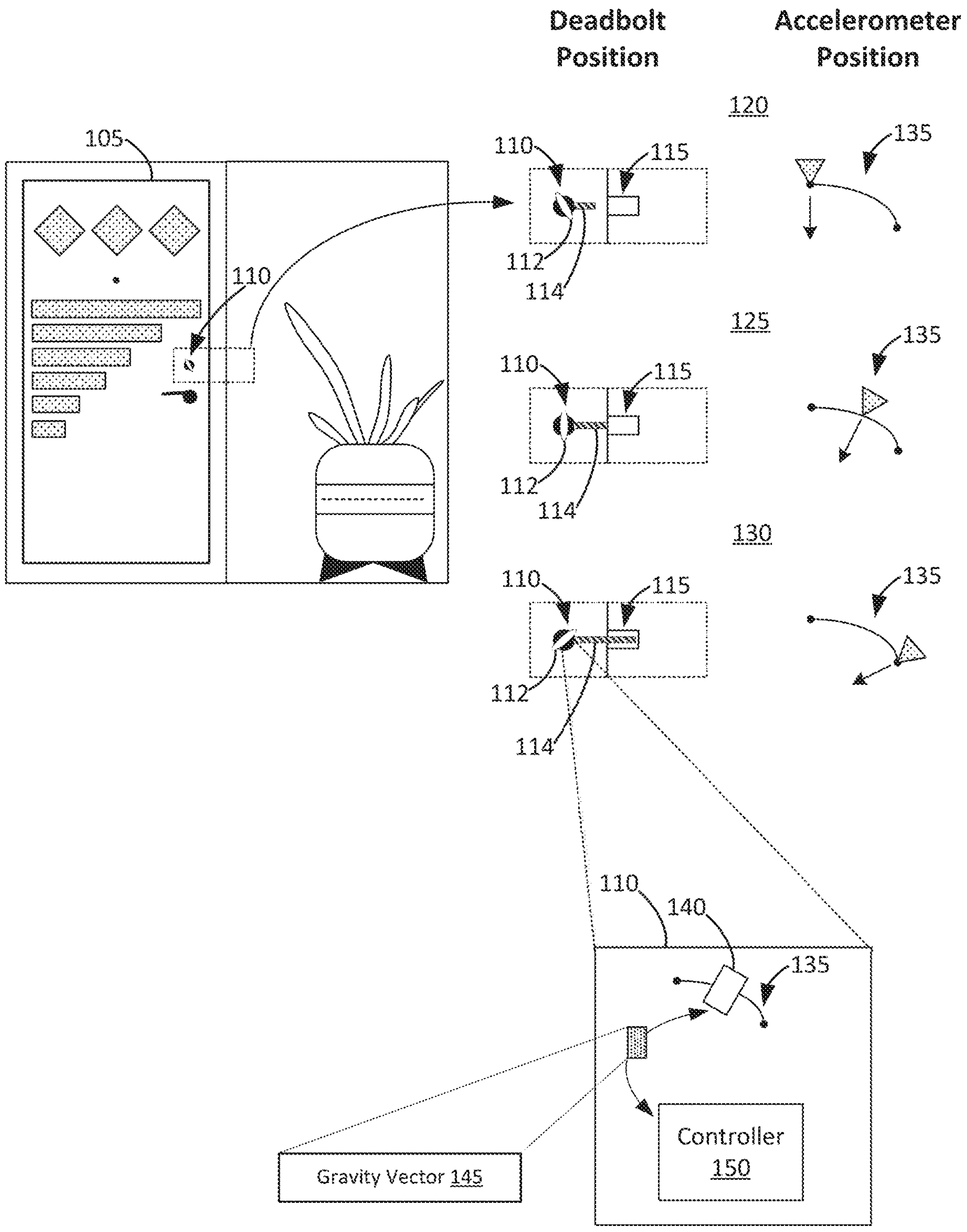
FIG. 1 illustrates an example of determining a position of a deadbolt by determining a gravity vector of an accelerometer.

This disclosure describes devices and techniques for an electromechanical lock. In one example, an electromechanical lock can be a "smart" lock that can lock or unlock a door by receiving instructions from a wireless electronic device such as a smartphone, tablet, smartwatch, etc. The electromechanical lock can include an accelerometer positioned upon a component (e.g., a throw arm) that rotates along an arc, or curved or non-linear path, as the deadbolt of the electromechanical lock retracts away from or extends along a linear path into a deadbolt slot of the door jamb having a deadbolt strike plate to unlock or lock the door, respectively. For example, as the key or the paddle of the electromechanical lock is rotated, this can result in the component that the accelerometer is positioned upon to also rotate. Additionally, the electromechanical lock can receive data from a smartphone requesting that it lock or unlock the door. In this case, it can use a motor to retract or extract the deadbolt, which also causes the component that the accelerometer is positioned upon to rotate. As a result, the accelerometer can also rotate as the electromechanical lock transitions between locked and unlocked states.

Each position along the arc can have a corresponding unique gravity vector in comparison to other positions that can be determined by the accelerometer. For example, the gravity vector corresponding to the deadbolt in the unlocked state (e.g., fully retracted, or at one end of its travel range) can be different than the gravity vector corresponding to the deadbolt in the locked state (e.g., fully extended, or it has reached the other end of its travel range) because the accelerometer would be upon different places along the arc and, therefore, at different inclinations. The other positions in between the unlocked state and locked state, for example corresponding to a ten percent extended deadbolt, a fifty percent extended deadbolt, an eighty percent extended deadbolt, etc. can each also have unique gravity vectors. Thus, the accelerometer can provide the gravity vector to a controller circuit which can use the gravity vector to determine the position of the deadbolt.

Determining the linear position of the deadbolt (e.g., along a path between the electromechanical lock and the deadbolt slot) using a gravity vector as determined by an accelerometer that rotates along an arc (e.g., along a curved or non-linear path) with a component of the electromechanical lock can allow for a precise determination of the position of the deadbolt. Additionally, an accelerometer can use significantly lower power than other types of sensors. Therefore, the electromechanical lock can operate more often while not draining its battery as quickly as electromechanical locks using different types of sensors.

This disclosure also describes touch and wireless capabilities of the electromechanical lock. For example, a capacitive touch sensor of the electromechanical lock can determine the presence of a human finger upon the bezel (or surface) of the electromechanical lock. The presence of that human finger, or a movement of that human finger upon the bezel, can be used to lock or unlock the door. In another implementation, a fingerprint can be recognized and used to lock or unlock the door. Moreover, a near-field communication (NFC) capability can be implemented to allow a smartphone to lock or unlock the door using a smartphone in close proximity with the electromechanical lock.

In more detail, FIG. 1 illustrates an example of determining a position of a deadbolt by determining a gravity vector of an accelerometer. In FIG. 1, door 105 can include electromechanical lock 110 having a paddle 112 on the inside of an environment (e.g., a home that the door provides access) and a key slot on the outside. Turning paddle 112 in one direction can result in deadbolt 114 to retract into a housing or enclosure of electromechanical lock 110 to unlock door 105. Turning paddle 112 in the other direction can result in deadbolt 114 to extend into deadbolt slot 115 of a doorjamb to lock door 105. Inserting the key and rotating in different directions can also unlock or lock door 105.

Electromechanical lock 110 can be a "smart" lock having a variety of functionality including computing devices having wireless communications capabilities that allow it to communicate with other computing devices. For example, the homeowner of the home that door 105 provides access to might have a smartphone that can wirelessly communicate with electromechanical lock 110 via one of the Institute of Electrical and Electronics Engineers (IEEE) 802.11 standards, Bluetooth®, Zigbee, Z-Wave, or other wireless communication techniques. In some implementations, electromechanical lock 110 can access a network such as the Internet via the smartphone. In other implementations, electromechanical lock 110 can access another network on its own without the smartphone as an intermediary. Thus, electromechanical lock 110 and the homeowner's smartphone can exchange data amongst themselves. For example, electromechanical lock 110 can provide data regarding the state of electromechanical lock 110 to the smartphone so that the homeowner knows whether door 105 is fully locked in a secure state, is unlocked, or other characteristics regarding door 105, or characteristics of or operation of electromechanical lock 110. Electromechanical lock 110 can also receive data from the smartphone via wireless communications providing an instruction to unlock or lock door 105. For example, electromechanical lock 110 can include a motor that can be activated (e.g., turned on) to retract or extract deadbolt 114 without having the homeowner manually use a key or paddle 112.

In FIG. 1, electromechanical lock 110 can determine the position of deadbolt 114 to determine characteristics of electromechanical lock 110 and/or door 105. For example, the position of deadbolt 114 can provide an indication as to whether door 105 is in a locked state or an unlocked state, or even in some partially locked or partially unlocked state. This information can then be provided to a smartphone such that the homeowner can know the state of door 105. Additionally, electromechanical lock 110 can determine whether to cease operation of the motor (i.e., stop retracting or extending deadbolt 114) based on the position of deadbolt 114. For example, when deadbolt 114 is fully retracted to unlock the door or fully extended to lock the door, the motor can be instructed to cease operation, for example, by providing a control signal that is used to turn on or off the motor.

The position of deadbolt 114 can be determined by using accelerometer 140 of electromechanical lock 110 as a sensor. Accelerometer 140 can be a device (e.g., a microelectromechanical systems (MEMS)-based sensor and related circuitry) that can measure the acceleration or tilt (or inclination) of an object that it is positioned upon. In FIG. 1, accelerometer 140 can be positioned upon a component of electromechanical lock 110 that rotates as deadbolt 114 retracts or extends. For example, electromechanical lock 110 can include a lock cylinder that rotates as the key slot or paddle 112 rotates, or can be rotated via a motor that is turned on upon receiving instructions from an electronic device such as a smartphone. The rotation of that cylinder can cause other components of electromechanical lock 110 to rotate, for example, a throw arm. If accelerometer 140 is positioned upon that rotatable component (e.g., the throw arm), then accelerometer 140 is itself rotated as electromechanical lock 110 retracts or extends deadbolt 114.

Figure 8:
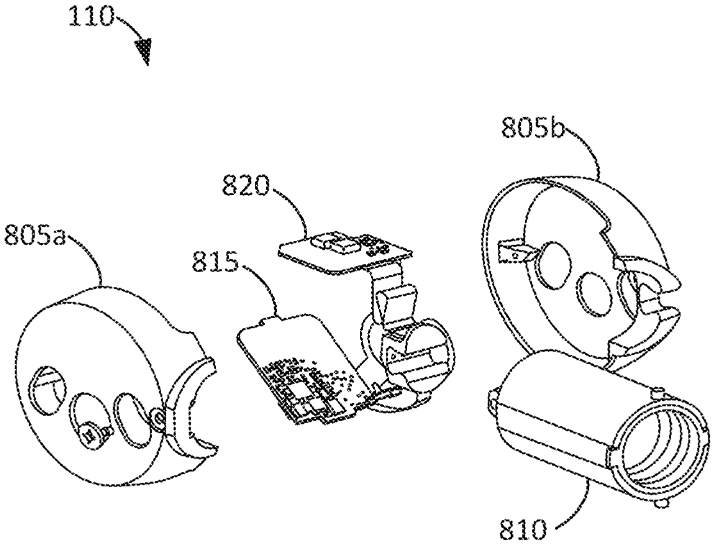
FIG. 8 illustrates an example of an accelerometer positioned within an electromechanical lock.

For example, FIG. 8 illustrates an accelerometer positioned within an electromechanical lock. In FIG. 8, accelerometer 140 can be placed on flexible circuit board 820 and printed circuit board 815 can include controller 150. These circuit boards can be housed within enclosures **805*a* and 805*b* of electromechanical lock 110 having a deadbolt shaft 810 for housing deadbolt 114. When paddle 112 is rotated, a key is inserted and rotated, or the motor is activated, this can cause deadbolt 114 to extend and for flexible circuit board 820 to rotate as deadbolt 114 extends. Thus, accelerometer 140 positioned upon flexible circuit board 820** also rotates.

Therefore, accelerometer 140 can move along a path that can be represented by an arc. As the accelerometer moves along that arc, the position of deadbolt 114 can change. That is, as accelerometer 140 moves along a curved path such as an arc, deadbolt 114 can move along a linear path as it extends from electromechanical lock 110 and into deadbolt slot 115 in the door jamb. The movement from the beginning to end of the arc can therefore represent the full travel range of deadbolt 114 from being fully retracted (e.g., causing door 105 to unlock) to being fully extended (e.g., causing door 105 to be locked) and positions in between. Accelerometer 140 can determine the gravity vector at the different positions. The gravity vector can be used to determine the position of deadbolt 114.

For example, in FIG. 1, at position 120, paddle 112 of electromechanical lock 110 can be at a position that allows for door 105 to be unlocked, for example, deadbolt 114 can be retracted into electromechanical lock 114 as close as its travel range allows. Thus, in FIG. 1 at position 120, no part of deadbolt 114 is within deadbolt slot 115 of the door jamb, allowing for door 105 to be unlocked and, therefore the homeowner can open door 105. Arc 135 at position 120 indicates that accelerometer 140 is at the beginning of its travel range corresponding to the position of paddle 112. If accelerometer 140 determines its gravity vector, it might be represented by the arrow indicating a downward vector in this simplified example. The gravity vector can represent a three-dimensional vector indicating the direction and/or magnitude of gravity based on the x, y, and z axes. Thus, the gravity vector can be used to determine accelerometer 140's orientation within space (e.g. its inclination), which can be different for different positions along arc 140 due to it being rotated as electromechanical lock 110 transitions among locked and unlocked states.

At position 125, paddle 112 is rotated from the initial position of position 120 to begin locking door 105. Thus, in FIG. 1, deadbolt 114 begins to extend into its travel range such that its tip extends farther away from the housing of electromechanical lock 110. As indicated, the position of accelerometer 140 along arc 135 changes, resulting in the gravity vector also changing. That is, at position 125, the angle of the gravity vector with respect to earth is different than at position 120 because accelerometer 140 is at a different position along arc 135 due to the rotation of the component. Thus, the gravity vector can represent a tilt or inclination of accelerometer 140 as it rotates along arc 135.

Next, at position 130 paddle 112 might be in a final position such that it cannot be moved further along its current path. This results in deadbolt 114 being fully extended from electromechanical lock 110 and occupying a significant amount of space within deadbolt slot 115 (e.g., more space than at positions 125, 120, or other positions along arc 135). This results in door 105 being in a "fully" locked state. Prior positions along arc 135 might have resulted in door 105 being locked (e.g., deadbolt 114 might not occupy as much space within deadbolt slot 115 but door 105 is still locked), but not as secure as in position 130. As indicated in FIG. 1, accelerometer 140 is at the other endpoint of arc 135 from the beginning position 120. Thus, as accelerometer 140 travels along the full curved travel range of arc 135, this also causes deadbolt 114 to travel along its full linear travel range to securely lock door 105. The gravity vector at position 130 is also different than the gravity vectors at positions 120 and 125.

The different positions along arc 135 can cause accelerometer 140 to determine or sense different gravity vectors. As accelerometer 140 moves along arc 135, gravity vector information 145 can be provided to controller 150 of electromechanical lock 110. Controller 150 can use the gravity vector information to determine the position of deadbolt 114. For example, because each different gravity vector is the result of accelerometer being at a different positions along arc 135, the different gravity vectors correspond go to different positions of deadbolt 114. Thus, if the gravity vector matches or is similar to a gravity vector stored in memory and accessible by controller 150 for a position associated with position 120, then controller 150 can determine that deadbolt 114 is in a fully retracted position and door 105 is fully unlocked and can be easily opened. If the gravity vector matches or is similar to a gravity vector associated with position 130, then controller 150 can determine that deadbolt 114 is in a fully extended position and door 105 is fully and securely locked and, therefore cannot be easily opened.

As discussed later herein, upon determining the position of deadbolt 114, controller 150 can perform a variety of functionalities. For example, controller 150 can provide information to the homeowner's smartphone to provide an indication as to whether door 105 is locked, unlocked, or even in a partially locked or unlocked state (e.g., not at positions 120 or 130). Controller 150 can also perform other functionalities, for example, it can retract and then extend deadbolt 114 again upon determining that the position is not appropriate. Additionally, controller 150 can instruct the motor of electromechanical lock 110 to cease operation upon a determination that the position of the deadbolt along its liner path corresponds to one of the endpoints of the non-linear path (e.g., the beginning or end) of the accelerometer because those endpoints would have different gravity vectors.

Using accelerometer 140 to determine the gravity vector and having controller 150 correlate that with the position of deadbolt 114 can provide a lower power solution. For example, accelerometers can use lower power than other types of sensors (e.g., hall effect sensors, rotary encoders, etc.). Additionally, accelerometers can occupy less space and, therefore, can easily fit within the limited space of electromechanical lock 110.

When the homeowner installs electromechanical lock 110 within door 105, a calibration process can be performed. For example, the homeowner can be requested (e.g., via the smartphone) to switch electromechanical lock from the unlocked state or locked state several times (e.g., by using paddle 112 or a key) such that the gravity vectors at positions 120 and 130 can be determined. That is, electromechanical lock 110 can be installed and then calibrated to determine the gravity vectors for position 120 and position 130 in FIG. 1. Electromechanical lock 110 can then be used to determine the position of deadbolt 114.

Figure 2:
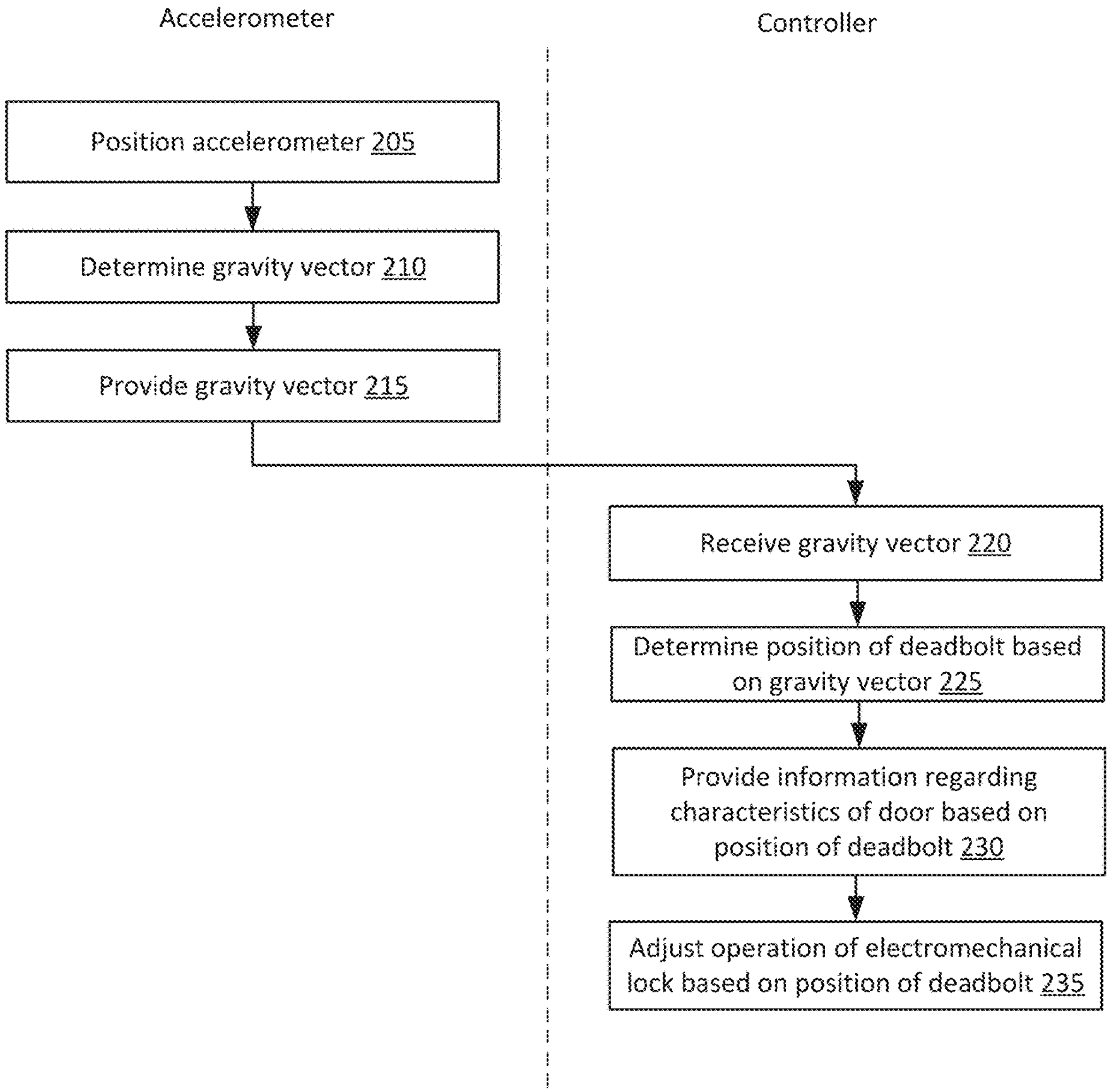
FIG. 2 illustrates an example of a block diagram for determining information regarding characteristics of a door based on the position of the deadbolt.

FIG. 2 illustrates an example of a block diagram for determining information regarding characteristics of a door based on the position of the deadbolt. In FIG. 2, the accelerometer can be positioned (205). For example, in FIG. 1, accelerometer 140 can be moved from position 120 to position 130. Accelerometer 140 can then determine the gravity vector based on its current position along arc 135. If the gravity vector changes, this means that the position of deadbolt 114 has changed. Thus, accelerometer 140 can "wake up" controller 150, for example, turn its power on, wake it up from a lower-power sleep state in which many of its functionalities are turned off, etc. so that it can begin to determine the position of deadbolt 114. By turning on controller 150 upon a change in the gravity vector, this can reduce power consumption because controller 150 doesn't have to be on or operational as much as accelerometer 140. Thus, the accelerometer can then provide the newly acquired gravity vector to the controller (215). For example, in FIG. 1, gravity vector information 145 can be provided to controller 150.

The controller can then receive the gravity vector information (220). Based on the gravity vector, the position of the deadbolt can then be determined (225). For example, in FIG. 1, if the gravity vector matches or is similar to the gravity vector of position 130, then this can indicate that the position of deadbolt 114 results in door 105 being securely locked. Information regarding the characteristics of the position of the deadbolt, electromechanical lock 110, or door 105 can then be provided, for example, to a smartphone of the homeowner or a server accessible via a network such as the Internet (230). For example, in FIG. 1, controller 150 can provide information to a smartphone of the homeowner indicating that electromechanical lock 110 is fully engaged to lock door 105.

The operation of the electromechanical lock can also be adjusted based on the position of the deadbolt (235). For example, in FIG. 1, deadbolt 114 can cease to be extended into deadbolt slot 115 when accelerometer 140 is at position 130 along arc 135. Thus, if the gravity vector matches or is similar to a gravity vector of one of the endpoints of arc 135 (e.g., positions 120 and 130 in FIG. 1), then this means that electromechanical lock 110 is in a lock state or unlock state and, therefore, deadbolt 114 should cease to be extended or retracted, respectively. This can be done by causing a motor of electromechanical lock to stop, extending or retracting deadbolt 114.

Figure 3:
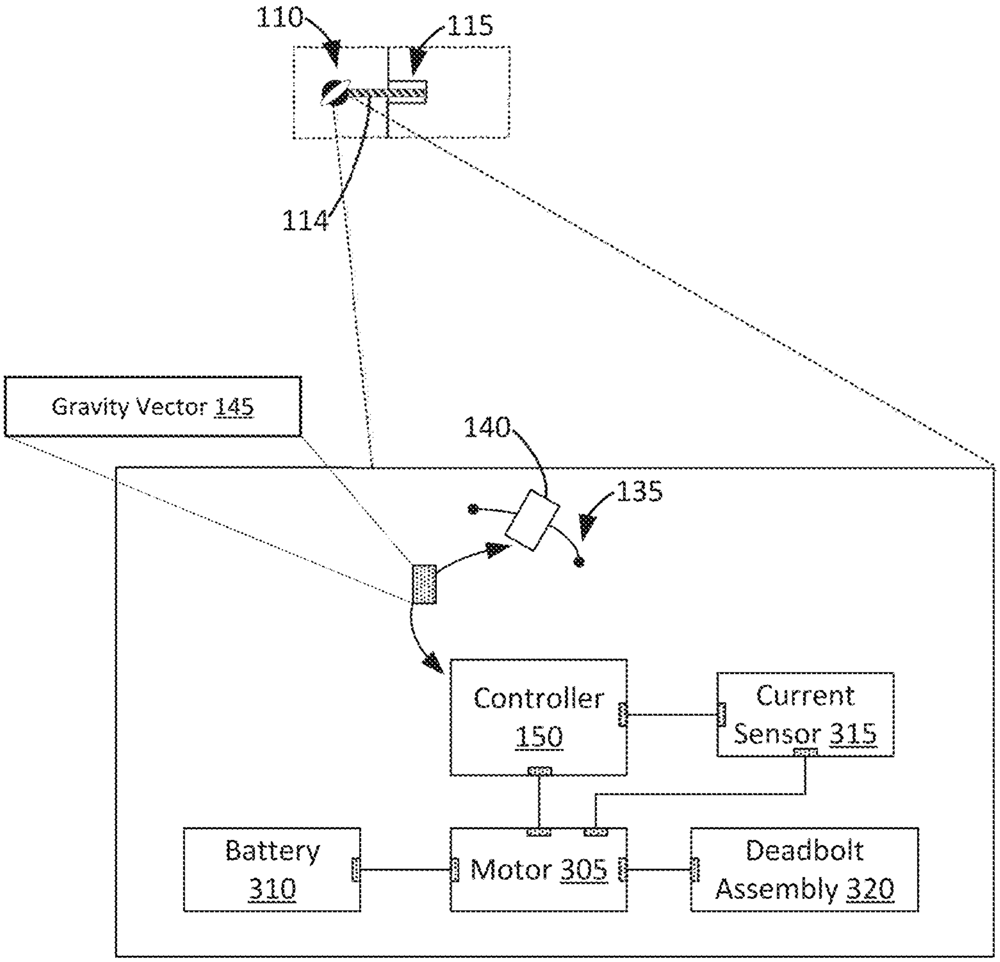
FIG. 3 illustrates an example of determining characteristics of a door based on a gravity vector and a current draw of a motor of an electromechanical lock.

Additional sensors of electromechanical lock 110 can also be used. FIG. 3 illustrates an example of determining characteristics of a door based on a gravity vector and a current draw of a motor of an electromechanical lock. In FIG. 3, controller 305 can instruct motor 305 to retract or extend deadbolt 114 housed within deadbolt assembly 320 (e.g., in response to receiving a command from a smartphone or other electronic device). Battery 310 can provide a power source for motor 305 to use to drive deadbolt assembly 320. In some implementations, battery 310 can be within deadbolt assembly 320 (e.g., it can be within deadbolt 114). In FIG. 3, current sensor 315 can determine the current being used, or drawn, by motor 305 as it attempts to position deadbolt 114 within deadbolt assembly 320. This information can then be provided to controller 150.

Using the information regarding the current being used by motor 305 and the gravity vector information 145 obtained from accelerometer 140, controller 150 can perform a variety of functionalities. For example, controller 150 can determine the position of deadbolt 114 and how much current is being used by motor 305 to position deadbolt 114. If the current being used by motor 305 is above a threshold current for the position that deadbolt 114 is currently at, this might indicate that there is some obstruction between deadbolt 114 and deadbolt slot 115, deadbolt 114 might not be properly aligned with deadbolt slot 115, etc. For example, an increase in friction can result in motor 305 needing to use more power (e.g., draw more current) to keep extending deadbolt 114 into deadbolt slot 115. If there is too much friction, then this might be the result of some obstruction, alignment issue, or other problem. Thus, controller 150 might then instruct motor 305 to retract deadbolt 114 and then extend it again. In another implementation, controller 150 might then instruct motor 305 to retract deadbolt 114 (e.g., to position 120 in FIG. 1) and then provide a message to the homeowner's smartphone that there is a problem with door 105.

Other characteristic regarding the usage of the battery by the motor can also be used when determining how to operate motor 305. For example, the voltage provided by the battery can also be considered. Additionally, other characteristics regarding electromechanical lock 110 can be considered. For example, the ambient temperature, the temperature within electromechanical lock 110, humidity or other characteristics of the environment, etc. can also be considered. In one example, if it is determined by controller 150 that the temperature and/or humidity are within a threshold range (e.g., too hot or too humid) then this might be indicative of some potential expansion of the door, door jamb, etc. and therefore there might be an increase in friction or resistance as deadbolt 114 retracts or extracts. Thus, controller 150 can operate motor 305 to use more current such that it has more power to position deadbolt 114. This can allow for electromechanical lock 105 to compensate for the change in environment.

Figure 4:
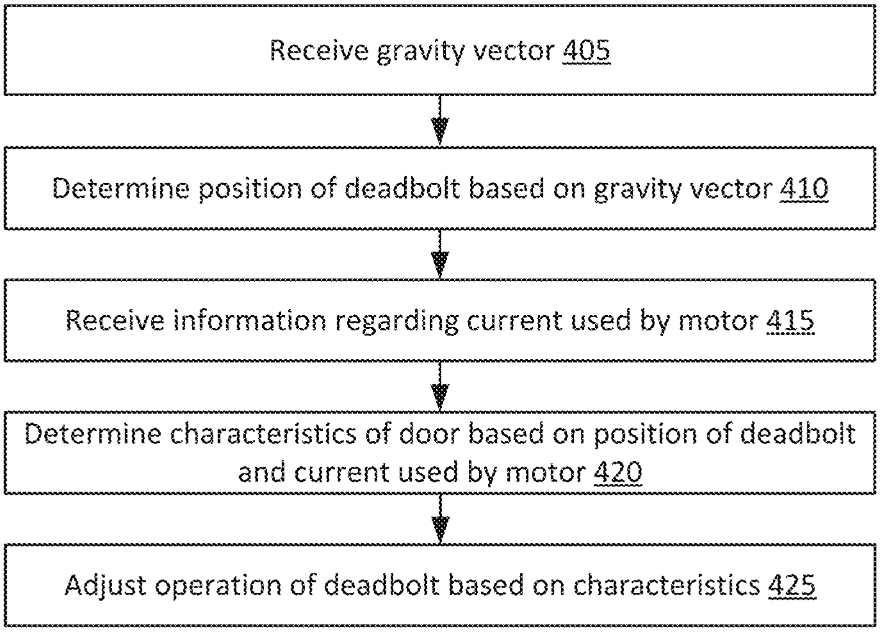
FIG. 4 illustrates an example of a block diagram for adjusting operation of a deadbolt based on characteristics of a door.

FIG. 4 illustrates an example of a block diagram for adjusting operation of a deadbolt based on characteristics of a door. In FIG. 4, a controller can receive gravity vector information (405). For example, in FIG. 3, controller 150 can obtain gravity vector information 145 from accelerometer 140. Using the gravity vector, the position of the deadbolt of the electromechanical lock can be determined (410). For example, in FIG. 3, the position of deadbolt 114 can be determined using gravity vector information 145. The controller can also receive information regarding the current used by a motor to cause the deadbolt to change positions (415). For example, in FIG. 3, motor 305 can be powered by battery 310 and, therefore, draw current as it pushes or pulls on deadbolt 114 to extend or retract it, respectively. This current can be monitored and determined by current sensor 315 and information regarding that current can be provided to controller 150.

The controller can then determine characteristics of the door, electromechanical lock, or deadbolt based on the position of the deadbolt and/or current used by the motor. For example, in FIG. 3, controller 150 can determine whether there is some obstruction blocking the entry of deadbolt 114 into deadbolt slot 115 if the current used by motor 305 is at or above some threshold current and the position of deadbolt 114 is determined to correspond to one of the positions along arc 135 in which it should be within deadbolt slot 115. The controller can then adjust the operation of the deadbolt based on the characteristics (425). For example, if it is determined that there is an obstruction, then controller 150 in FIG. 3 can retract deadbolt 114 and inform the homeowner that there is an obstruction preventing electromechanical lock 110 from locking door 105.

Many of the examples described herein include using the gravity vector as determined by an accelerometer. However, the same or different accelerometer can also provide other types of data. For example, an accelerometer can also provide information regarding acceleration of the component that it is placed upon. As a result, the accelerometer can determine the acceleration (or even merely the presence of acceleration) of the door as it swings towards an open state (after being unlocked) or closed state (to be locked). This information can be provided to a controller and the controller can then retract the deadbolt so that it does not hit the door jamb. This can prevent damage to the door jamb, door, and/or electromechanical lock and also provide a more comfortable homeowner experience if the homeowner uses the smartphone to lock the door while it is swinging.

Figure 5:
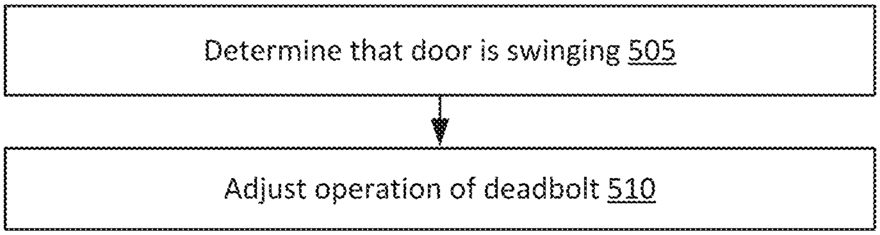
FIG. 5 illustrates another example of adjusting operation of a deadbolt.

FIG. 5 illustrates another example of adjusting operation of a deadbolt. In FIG. 5, the controller can determine that the door is swinging (505). For example, accelerometer 140 in FIG. 1 or 3 can be used to determine that it is experiencing acceleration. Because accelerometer 140 can be housed within electromechanical lock 140, this means that door 105 is swinging open or closed. Controller 150 can then adjust operation of the deadbolt based on the determination that the door is swinging (510). For example, controller 150 can instruct motor 305 in FIG. 3 to retract deadbolt 114 to a position such that it would not strike the door jamb, for example, fully retracted to position 120 in FIG. 1 or to position 125 (e.g., a position just before when it would enter deadbolt slot 115).

Figure 6:
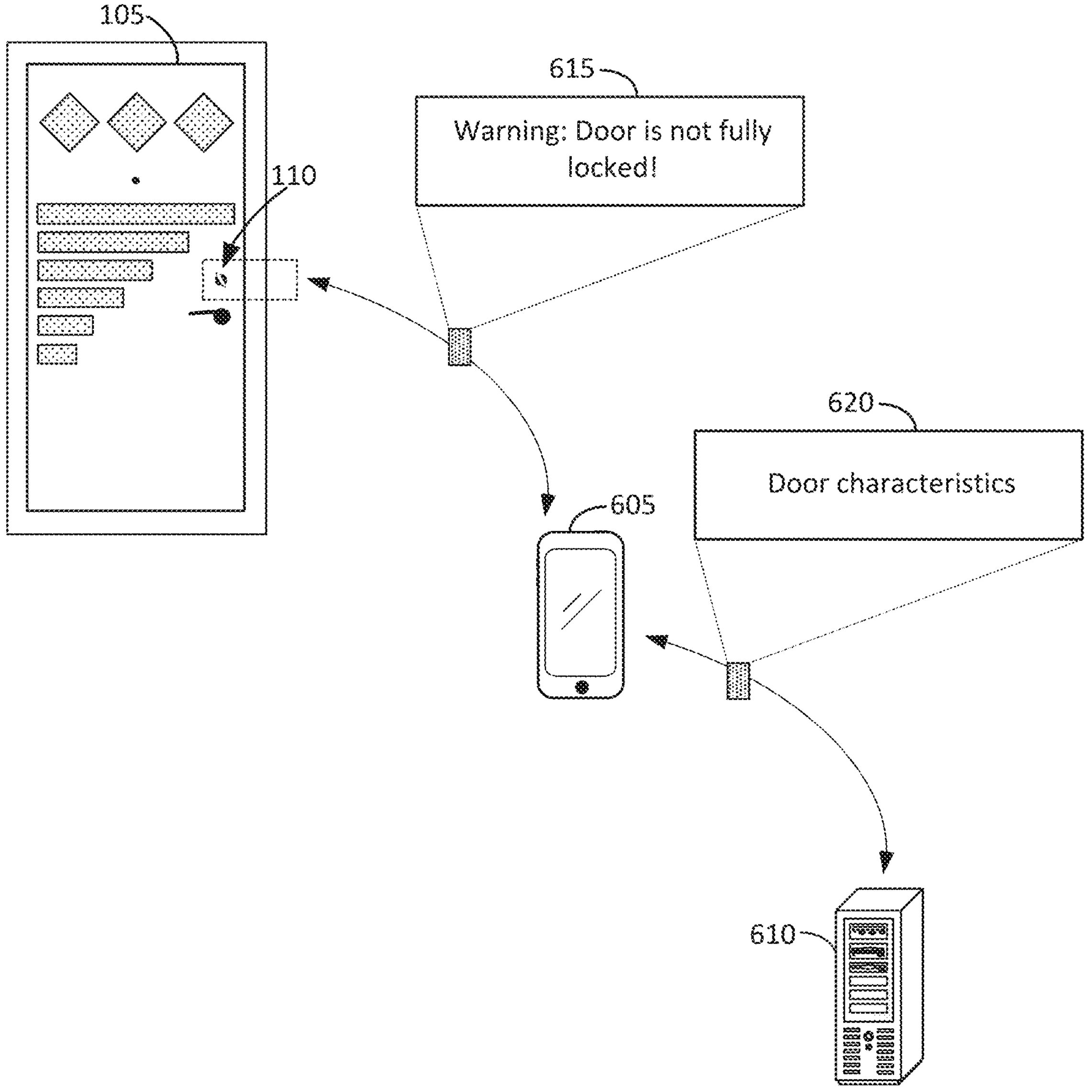
FIG. 6 illustrates an environment for using an electromechanical lock.

FIG. 6 illustrates an environment for using an electromechanical lock. As previously discussed, electromechanical lock 110 can be installed within door 105 and provide information to smartphone 605, for example, information 615 indicating that door 105 might not be fully locked. For example, if using the techniques disclosed herein that the controller of electromechanical lock 110 determines that the position of deadbolt 114 has only reached eighty percent of its travel range and motor 305 is no longer extending deadbolt 114 (e.g., because current sensor 315 indicates that it is drawing current above a threshold amount from battery 310 and, in some implementations, drawing too much current can result in the power to the motor to be turned off because drawing too much current can indicate the presence of an obstruction within the path of the deadbolt), then controller 150 can generate data and transmit it (e.g., wirelessly using an antenna of electromechanical lock 110) to smartphone 605 indicating that the door might be locked, but not to the full potential or capabilities of electromechanical lock 110 (e.g., not at position 130 in FIG. 1). Any of the characteristics or information regarding or generated by door 105, electromechanical lock 110, accelerometer 140, and deadbolt 114 can be provided to smartphone 605. For example, this can include the position of deadbolt 114, whether door 105 is in a locked state or unlocked state, the current used motor 305 to operate deadbolt 114, gravity vector information 145, etc. Additionally, this information can be provided to server 610, for example, a cloud server that smartphone 605 can connect with over the Internet. As depicted in FIG. 6, door characteristics 620 can be provided to server 610, but any of the information or characteristics described herein can also be provided to server 610. For example, characteristics regarding electromechanical lock 110, deadbolt 114, motor 305, etc. can be provided.

Figure 9:
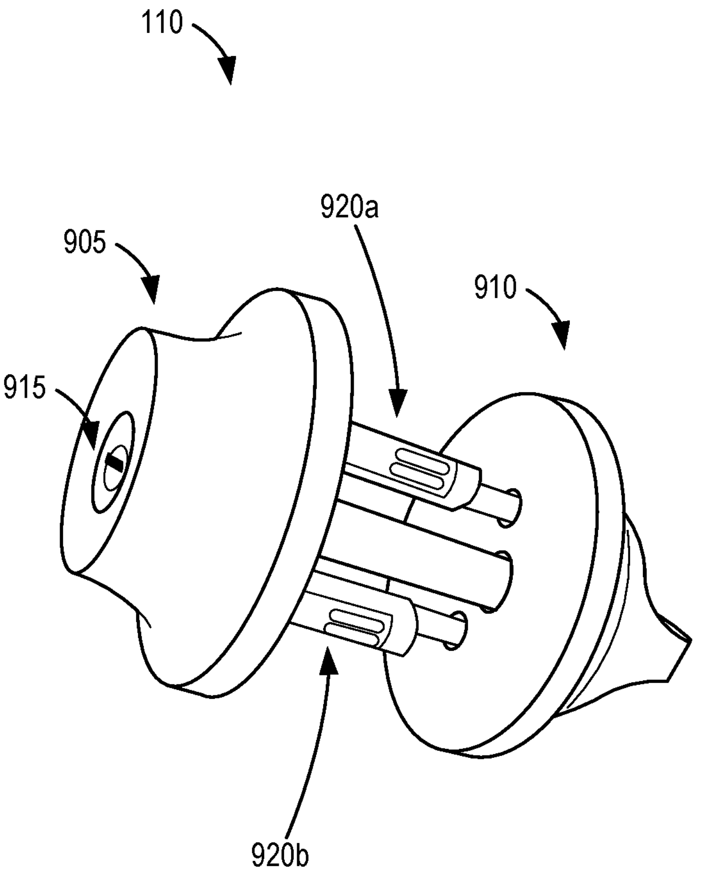
FIG. 9 illustrates an example of a bezel of an electromechanical lock.

FIG. 9 illustrates an example of a bezel of an electromechanical lock. In FIG. 9, electromechanical lock 110 includes a housing having external surfaces front bezel 905 and back bezel 910. When installed within door 105, back bezel 910 can be in the interior of the building when the door is shut (and/or locked) and front bezel 905 can be accessible from outside. Thus, paddle 112 can be installed upon back bezel 910 and include much of the circuitry to perform the capabilities described above. Front bezel 905 can include key slot 915 for a user to insert and rotate a key, which results in the deadbolt to retract or extract.

In some implementations, the components described herein providing the various functionalities can be installed within an existing door lock bezel. That is, a user might have an ornamental design of a door lock bezel that they like and, therefore, the electromechanical lock described herein can be installed within or between the existing bezels. However, in some implementations, the bezels can be replaced. In FIG. 9, front bezel 905 can be used to replace an existing bezel of a door lock.

In FIG. 9, front bezel 905 can include circuitry and other hardware to provide capacitive touch sensing and nearfield communication (NFC) to allow other techniques to provide an instruction to lock or unlock. The circuitry of front bezel 905 can be powered by tapping into a power source housed within back bezel 910 or within a battery disposed within deadbolt 114. The battery can be tapped via taps 920*a* and 920*b* which can provide conductive cabling or interconnect such that the battery can power the circuitry and components housed within front bezel 905. In some implementations, front bezel 905 can also include another battery and taps 920*a* and 920*b* can be used to charge that battery, provide charge from that battery to components housed within back bezel 910, etc.

In some implementations, front bezel 905 can tap a doorbell wiring to tap a power source and provide charge to the components within front bezel 905 or back bezel 910. That is, the wiring that is used to wire a doorbell on or close to the door can also be used to power the functionality described herein. For example, the wiring can be routed to and coupled with both the doorbell and front bezel 905 or back bezel 910 to power the various components described herein. As a result, the doorbell wiring can provide a power source to provide electric power to the touch sensor circuitry, the motor, the controller circuit, and other components of the electromechanical lock. This can reduce or eliminate the use of a battery within the electromechanical lock, saving costs and reducing the size of the electromechanical lock.

In some implementations, front bezel 905 can include capacitive touch capabilities to lock or unlock the door. For example, a capacitive touch sense circuit can be installed on a flex or printed circuit board (PCB) within front bezel 905 to determine that a human finger has touched front bezel 905. If a human finger is detected, then the door can be unlocked (e.g., the deadbolt can be retracted). In some implementations, the fingerprint of the finger can be detected and imaged, and if that imaged fingerprint is determined to be an authorized fingerprint (e.g., of the homeowner who previously registered his or her fingerprints) then the door can be unlocked.

Figure 10:
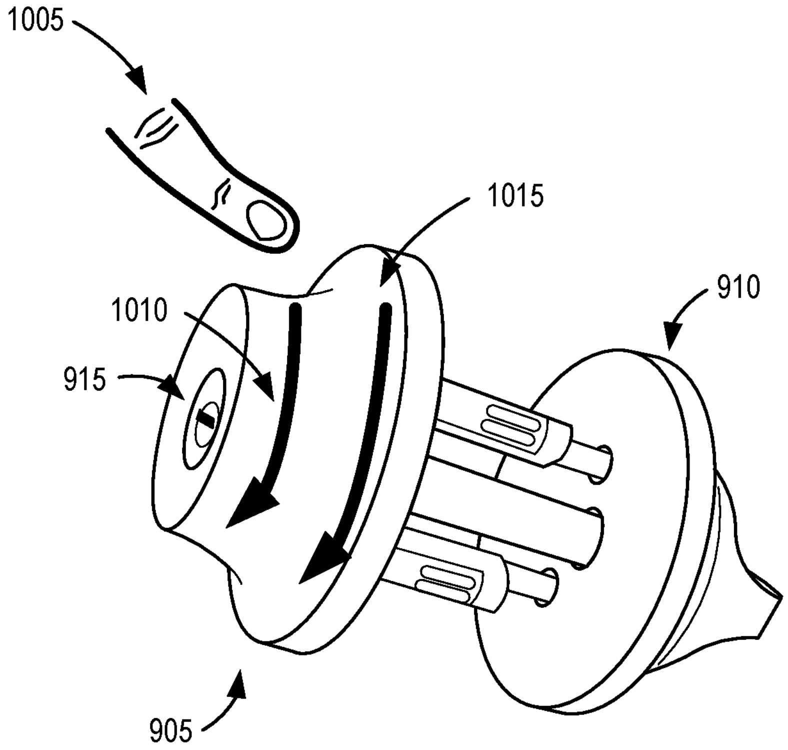
FIG. 10 illustrates an example of a touch used to lock or unlock a door.

In one example of detecting touch to lock or unlock a door, a homeowner can swipe, or move a finger, along the surface of front bezel 905 or back bezel 910 to lock or unlock the door by adjusting the position of the deadbolt along the linear path, as previously discussed, in response to the movement of the finger. FIG. 10 illustrates an example of a touch used to lock or unlock a door.

In FIG. 10, a human finger 1005 can be disposed upon front bezel 905 and move along the surface in a circular path 1010 around the protrusion of the housing surrounding key slot 915. As finger 1005 moves along circular path 1010, the deadbolt of the electromechanical lock (e.g., deadbolt 114 in the previously discussed examples) can be positioned along its linear path to lock or unlock the door. For example, finger 1005 might be moved along circular path 1010 and various points of circular path 1010 correspond to different positions for the deadbolt to be positioned to. Thus, finger 1005 might move, or be swiped, along front bezel 905 for a particular threshold distance in order for the deadbolt to be fully extended to lock the door. Likewise, finger 1005 might along be swiped along circular path 1010 to unlock the door by retracting the deadbolt.

In some implementations, the movement along circular path 1010 might be in different directions to lock or unlock the door. For example, moving finger 1005 in a clockwise direction might result in the deadbolt to be extended to lock the door, and moving finger 1005 in a counter-clockwise direction might result in the deadbolt to be retracted to unlock the door. In some implementations, the touch of finger 1005 and moving along circular path 1010 might be designated to be along a fixed location, for example, a fixed start and end point for finger 1005 to move along to extend or retract the deadbolt. However, in other implementations, finger 1005 can be initially disposed upon many or any part of front bezel 905 and moved for the particular threshold distance to extend or retract the deadbolt. For example, at a first time, finger 1005 can be swiped along the top part of front bezel 905 above key slot 915, and at a second time, finger 1005 can be swiped along the bottom part of front bezel 905 below key slot 915. In another example, finger 1005 can be placed on a different part of front bezel 905, for example, along circular path 1015 on a part of front bezel 905 that is facing the person using the electromechanical lock rather than around key slot 915. Additionally, back bezel 910 can also include similar touch capabilities to lock or unlock the door from the interior of the building.

Figure 11:
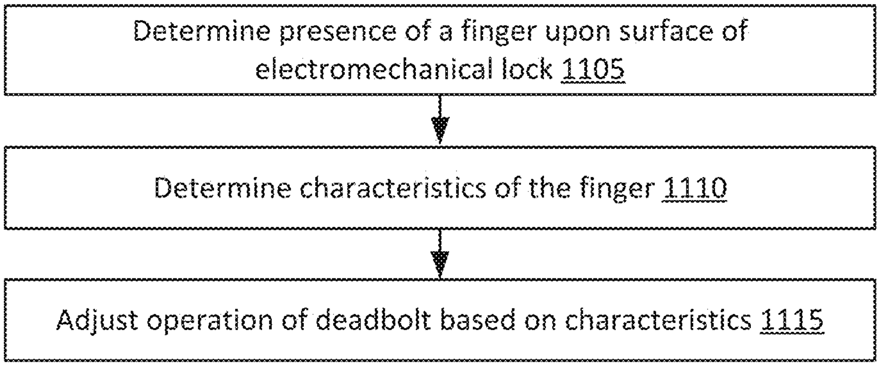
FIG. 11 illustrates an example of a block diagram for determining a touch to lock or unlock a door.

FIG. 11 illustrates an example of a block diagram for determining a touch to lock or unlock a door. In FIG. 11, presence of a finger upon a surface of an electromechanical lock can be determined (1105). For example, in FIG. 10, finger 1005 can be placed upon front bezel 905 of an electromechanical lock. The electromechanical lock might include a capacitive touch sensor that can determine the presence of finger 1005 upon front bezel 905 via a variety of techniques. For example, the mutual coupling between row and column electrodes can be determined to have been changed which can signify a presence of touch, or the parasitic capacitance can be changed. In some implementations, the change in the capacitance can be determined to be within a threshold capacitance range that can be correlated with a human finger (e.g., human skin).

Next, characteristics of the finger can be determined (1110). For example, in FIG. 10, the movement of the finger upon front bezel 905 and along circular path 1010 can be determined. Based on the characteristics, the operation of the deadbolt can be adjusted (1115). For example, deadbolt 114 as described herein can be extended or retracted to adjust the position of deadbolt 114 along a linear path to lock or unlock a door, respectively. Thus, touch sensor circuitry of the electromechanical lock can be configured to determine presence of a finger upon the bezel, and determine characteristics of the finger upon the determination of the presence of the finger upon the bezel. A controller circuit can then operate the motor of the electromechanical lock to retract or extend the deadbolt based on the characteristics of the finger.

Though some of the prior examples describe recognition of a touch and swipe of a finger as the determined characteristics to adjust the deadbolt, other characteristics can be used. For example, merely the touch of a finger can be determined. In another example, a fingerprint reader can be implemented within the electromechanical lock and a person can place a finger upon a front bezel 905 to lock or unlock the door based on the fingerprint of the finger being recognized as an authorized fingerprint. In some implementations, a door can be locked by any fingerprint, but unlocked upon an authorized fingerprint. This can allow for a guest in the home to lock the door, but prevents the door from being unknowingly unlocked for the homeowner.

In another implementation, force or pressure sensitive sensors can be used to determine an amount of force or pressure applied to front bezel 905. The characteristics of the finger can further be based on the amount of force or pressure applied. For example, a certain amount of pressure can be applied and the increase in amount of pressure can result in the deadbolt to extend along the linear path to lock the door.

In some implementations, near-field communication (NFC) can also be implemented by circuitry within front bezel 905. For example, a homeowner can tap front bezel 905 with a smartphone. Using NFC, the smartphone can be recognized by the circuitry that it belongs to the homeowner, for example, by exchanging an identifier of the smartphone. Upon that determination, the door can be unlocked from the locked state, or vice versa. In some implementations, the antenna for the NFC can be housed within front bezel 905. For example, it can be looped around the interior of a circular front bezel 905 such that it is behind the face of front bezel 905. In other implementations, the antenna can be placed on the exterior of front bezel 905. For example, it can be disposed around key slot 915. In another implementation, the antenna can be embedded within or around key slot 915. For example, the cylinder that houses key slot 915 and rotates as the key rotates can include the antenna wrapped around it.

Figure 12:
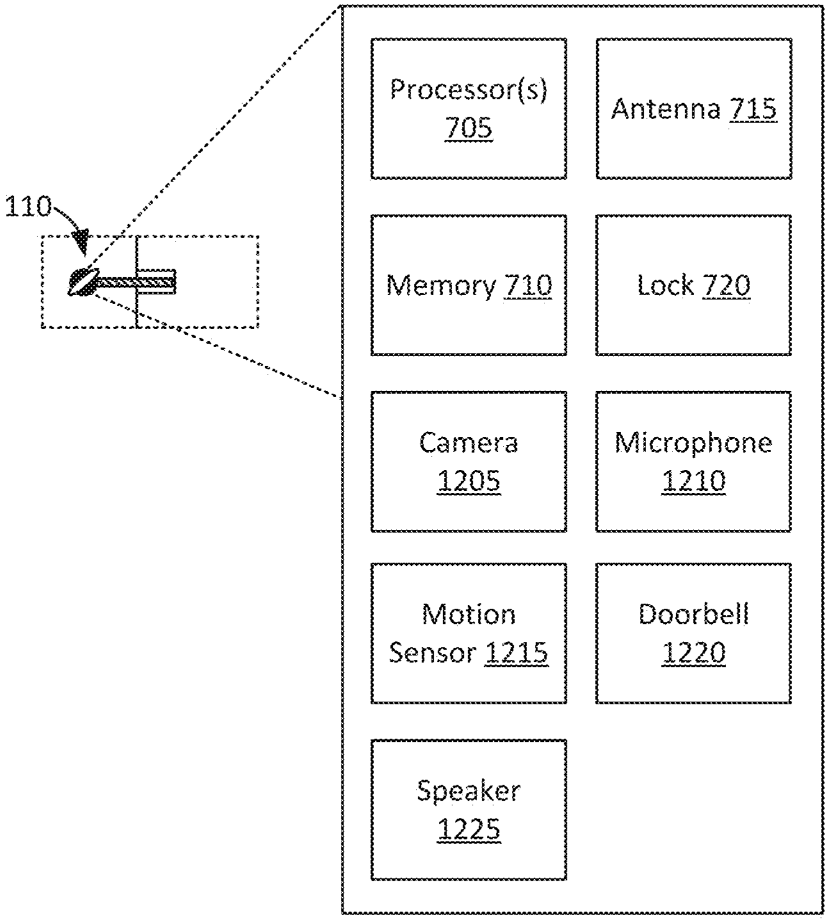
FIG. 12 illustrates an example of an electromechanical lock.

In some implementations, front bezel 905 can also include a camera, a microphone, motion sensor, or a doorbell. FIG. 12 illustrates an example of an electromechanical lock. In FIG. 12, electromechanical lock 110 can implement the features described herein using a variety of components. In addition to processors 705, antenna 715, memory 710, and lock components 720, electromechanical lock 110 can also include camera 1205, microphone 1210, motion sensor 1215, doorbell 1220, and speaker 1225.

For example, camera 1205 can record and provide visual images regarding activities occurring in front of front bezel 905. This can be used to alert a homeowner regarding who is at the door that is secured via electromechanical lock 110. In some implementations, the visual images can be still images, a series of still images, video, etc. that can be provided and viewed via a smartphone.

Microphone 1210 can record audio content regarding activities occurring in front of front bezel 905. For example, microphone 1210 can be used to record audio for the video provided using camera 1205.

Speaker 1225 can be used to provide audio output for a person in front of electromechanical lock 110. For example, using a smartphone, a homeowner inside can have an audio conversation with a person outside. In another example, the speaker can provide an audio output in the form of speech indicating whether the door is locked or unlocked. In another example, the homeowner can ask the door lock whether it is locked or unlocked (e.g., ask for its state). This can be picked up by microphone 1210, the state of the lock can be determined, and then the audio output indicating the state can be provided using speaker 1225.

Motion sensor 1215 can be used to determine that activity is occurring (e.g., due to the movement of objects detected) and then used to activate camera 11205 and/or microphone 1210 to record content. Motion sensor 1215 can also be used to active other components (e.g., lock components 720) described herein. Thus, when components are not activated, the components can be in a low-power state or even powered off. When motion sensor 1215 detects motion, these components can be activated, or switched from a low-power state to a higher-power state in which more functionalities are enabled, or powered on to enable functionalities.

Doorbell 1220 can also be implemented by electromechanical lock 110. For example, a button can be disposed upon front bezel 905. The button can implement part of a doorbell, which, when pressed, can generate a signal received by processors 705 and used to activate a doorbell chime inside the building. In some implementations, a speaker can be implemented upon back bezel 910 and a doorbell chime can be generated as an audio output using the speaker.

Figure 7:
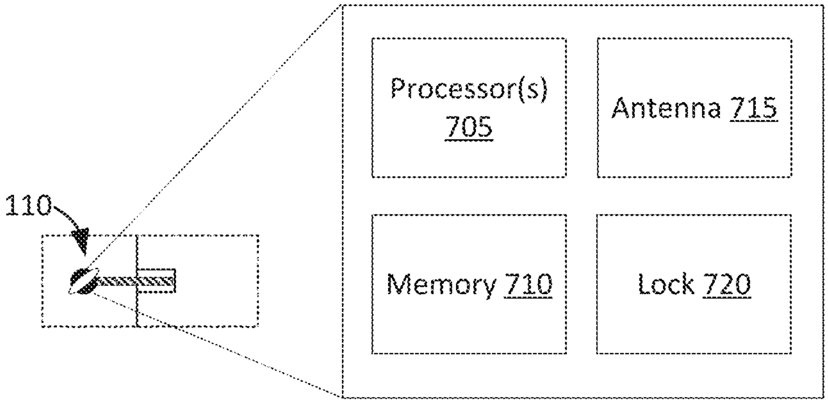
FIG. 7 illustrates an example of an electromechanical lock.

FIG. 7 illustrates an example of an electromechanical lock. In FIG. 7, electromechanical lock 110 includes a processor 705, memory 710, antenna 715, and lock components 720 (e.g., the components used to implement retracting and extending deadbolt 114 such as those described in FIGS. 1-6). In some implementations, electromechanical lock 110 can also include touchscreen displays, speakers, microphones, as well as other types of hardware such as non-volatile memory, an interface device, camera, radios, etc. to lock components 110 providing the techniques and systems disclosed herein. For example, lock components 720 can implement a variety of modules, units, components, logic, etc. implemented via circuitry and other hardware and software to provide the functionalities described herein along with processor 705 (e.g., implementing controller 150). Various common components (e.g., cache memory) are omitted for illustrative simplicity. The electromechanical lock in FIG. 7 is intended to illustrate a hardware device on which any of the components described in the example of FIGS. 1-6 (and any other components described in this specification) can be implemented. The components of the electromechanical lock can be coupled together via a bus or through some other known or convenient device.

The processor 705 may be, for example, a microprocessor circuit such as an Intel Pentium microprocessor or Motorola power PC microprocessor. One of skill in the relevant art will recognize that the terms “machine-readable (storage) medium” or “computer-readable (storage) medium” include any type of device that is accessible by the processor. Processor 705 can also be circuitry such as an application specific integrated circuits (ASICs), complex programmable logic devices (CPLDs), field programmable gate arrays (FPGAs), structured ASICs, etc.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk; a magnetic-optical disk; an optical disk; a read-only memory (ROM) such as a CD-ROM, EPROM, or EEPROM; a magnetic or optical card; or another form of storage for large amounts of data. Some of this data is often written, by a direct memory access process, into memory during the execution of software in the computer. The non-volatile storage can be local, remote or distributed. The non-volatile memory is optional because systems can be created with all applicable data available in memory. A typical computer system will usually include at least a processor, memory, and a device (e.g., a bus) coupling the memory to the processor.

The software can be stored in the non-volatile memory and/or the drive unit. Indeed, storing an entire large program in memory may not even be possible.

Nevertheless, it should be understood that for software to run, it may be necessary to move the software to a computer-readable location appropriate for processing, and, for illustrative purposes, that location is referred to as memory in this application. Even when software is moved to memory for execution, the processor will typically make use of hardware registers to store values associated with the software and make use of a local cache that, ideally, serves to accelerate execution. As used herein, a software program is can be stored at any known or convenient location (from non-volatile storage to hardware registers).

The bus also couples the processor to the network interface device. The interface can include one or more of a modem or network interface. Those skilled in the art will appreciate that a modem or network interface can be considered to be part of the computer system. The interface can include an analog modem, an ISDN modem, a cable modem, a token ring interface, a satellite transmission interface (e.g., “direct PC”), or other interface for coupling a computer system to other computer systems. The interface can include one or more input and/or output devices. The input and/or output devices can include, by way of example but not limitation, a keyboard, a mouse or other pointing device, disk drives, printers, a scanner, and other input and/or output devices, including a display device. The display device can include, by way of example but not limitation, a cathode ray tube (CRT), a liquid crystal display (LCD), or some other applicable known or convenient display device.

In operation, the assistant device can be controlled by operating system software that includes a file management system, such as a disk operating system. The file management system is typically stored in the non-volatile memory and/or drive unit and causes the processor to execute the various acts required by the operating system to input and output data, and to store data in the memory, including storing files on the non-volatile memory and/or drive unit.

Some items of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electronic or magnetic signals capable of being stored, transferred, combined, compared, and/or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, those skilled in the art will appreciate that throughout the description, discussions utilizing terms such as “processing” or “computing” or “calculating” or “determining” or “displaying” or “generating” or the like refer to the action and processes of a computer system or similar electronic computing device that manipulates and transforms data represented as physical (electronic) quantities within the computer system’s registers and memories into other data similarly represented as physical quantities within the computer system’s memories or registers or other such information storage, transmission, or display devices.

The algorithms and displays presented herein are not inherently related to any particular computer or other apparatus. Various general-purpose systems may be used with programs in accordance with the teachings herein, or it may prove convenient to construct more specialized apparatuses to perform the methods of some embodiments. The required structure for a variety of these systems will be apparent from the description below. In addition, the techniques are not described with reference to any particular programming language, and various embodiments may thus be implemented using a variety of programming languages.

In further embodiments, the assistant device operates as a standalone device or may be connected (e.g., networked) to other machines. In a networked deployment, the assistant device may operate in the capacity of a server or of a client machine in a client-server network environment or may operate as a peer machine in a peer-to-peer (or distributed) network environment.

In some embodiments, the assistant devices include a machine-readable medium. While the machine-readable medium or machine-readable storage medium is shown in an exemplary embodiment to be a single medium, the term “machine-readable medium” and “machine-readable storage medium” should be taken to include a single medium or multiple media (e.g., a centralized or distributed database and/or associated caches and servers) that store the one or more sets of instructions. The term “machine-readable medium” and “machine-readable storage medium” should also be taken to include any medium that is capable of storing, encoding, or carrying a set of instructions for execution by the machine, and which causes the machine to perform any one or more of the methodologies or modules of the presently disclosed technique and innovation.

In general, the routines executed to implement the embodiments of the disclosure may be implemented as part of an operating system or a specific application, component, program, object, module, or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally, regardless of the particular type of machine- or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disc Read-Only Memory (CD-ROMS), Digital Versatile Discs, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium may typically be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe certain principles and practical applications, thereby enabling others skilled in the relevant art to understand the subject matter, the various embodiments and the various modifications that are suited to the particular uses contemplated.

While embodiments have been described in the context of fully functioning computers and computer systems, those skilled in the art will appreciate that the various embodiments are capable of being distributed as a program product in a variety of forms and that the disclosure applies equally regardless of the particular type of machine- or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details while still being encompassed by the specification. As noted above, particular terminology used when describing certain features or aspects of various embodiments should not be taken to imply that the terminology is being redefined herein to be restricted to any specific characteristics, features, or aspects of the disclosed technique with which that terminology is associated. In general, the terms used in the following claims should not be construed to limit the disclosure to the specific embodiments disclosed in the specification, unless those terms are explicitly defined herein. Accordingly, the actual scope of the technique encompasses not only the disclosed embodiments but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the technique be limited not by this Detailed Description, but rather by any claims that issue on an application based hereon. Accordingly, the disclosure of various embodiments is intended to be illustrative, but not limiting, of the scope of the embodiments, which is set forth in the following claims.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. An electromechanical smart lock to lock and unlock a door of a building, comprising:
- a housing, including a bezel, the housing defining an exterior surface of the electromechanical smart lock;
- touch sensor circuitry positioned on a surface of the bezel and configured to detect a motion of a finger that traces the surface of the bezel;
- a deadbolt;
- a motor configured to actuate the deadbolt between a lock state and an unlock state; and
- a controller circuit configured to operate the motor based on detection of the motion of the finger tracing the surface of the bezel.

2. The electromechanical smart lock of claim 1, wherein the touch sensor circuitry further identifies a fingerprint of the finger, and the controller is further configured to operate the motor based on a determination that the fingerprint matches a stored fingerprint.

3. The electromechanical smart lock of claim 1, further comprising:
- a power source configured to provide electric power to the touch sensor circuitry, the motor, and the controller circuit, the power source coupled with a doorbell wiring of the door.

4. The electromechanical smart lock of claim 1, further comprising:

a power source configured to provide electric power to the touch sensor circuitry, the motor, and the controller circuit, the power source disposed within a front bezel of the electromechanical door lock.

5. The electromechanical smart lock of claim 1, further comprising:

a power source configured to provide electric power to the touch sensor circuitry, the motor, and the controller circuit, the power source disposed within a back bezel of the electromechanical door lock.

6. The electromechanical smart lock of claim 1, wherein the touch sensor circuitry is further configured to detect a direction of finger that traces the surface of the bezel, and the controller circuit further configured to operate the motor based on the direction of the finger.

7. An electromechanical lock, comprising:

a bezel portion of an exterior surface of the electromechanical lock;

touch sensor circuitry positioned on a surface of the bezel and configured to detect pressure from a finger on the surface of the bezel;

a deadbolt configured to retract to be in an unlock state, and configured to extend to be in a lock state; and a controller circuit configured to generate control signals that cause the deadbolt to extend or retract based on detection of the pressure from the finger on the surface of the bezel.

8. The electromechanical lock of claim 7, wherein the touch sensor circuitry further identifies a fingerprint of the finger, and the controller is further configured to generate control signals that cause the deadbolt to extend or retract based on a determination that the fingerprint matches a stored fingerprint.

9. The electromechanical lock of claim 7, wherein the touch sensor circuitry is further configured to detect a motion of the finger that traces a surface of the bezel, the controller is further configured to generate control signals that cause the deadbolt to extend or retract based on motion of the finger.

10. The electromechanical lock of claim 9, further comprising:

a key slot, and wherein the motion of the finger upon the bezel is a circular motion around the key slot.

11. The electromechanical lock of claim 9, wherein the motion of the finger is a circular motion upon the bezel.

12. The electromechanical lock of claim 7, further comprising:

a power source configured to provide electric power to the controller circuit, the power source coupled with a doorbell wiring of the door.

13. The electromechanical lock of claim 7, further comprising:

a motor configured to be operated by the controller circuit to adjust the deadbolt between the lock state and the unlock state.

14. A method, comprising:

detecting, by a touch sensor positioned on a surface of a bezel of an electromechanical lock, a motion of a finger tracing the surface of the bezel;

generating a control signal based on the motion of the finger tracing the surface of the bezel; and in response to the control signal, actuating, by a motor, a position of a deadbolt.

15. The method of claim 14, further comprising:

detecting, by the touch sensor, a fingerprint of the finger;

determining, by a processor, that the fingerprint matches a stored fingerprint; and wherein the control signal is further based on the determination that the fingerprint matched the stored fingerprint.

16. The method of claim 14, further comprising:

detecting, by the touch sensor, a direction of finger that traces the surface of the bezel; and wherein the control signal is further based on the direction of the finger.

17. The method of claim 14, further comprising:

detecting, by the touch sensor, a pressure from the finger on the surface of the bezel; and wherein the control signal is further based on the pressure of the finger.

18. The method of claim 16, wherein the direction of the finger upon the bezel is a circular motion around a key slot.

* * * * *